Sept. 8, 1953 M. M. ALEXANDER 2,651,343
AUTOMATIC SALAD CHOPPER AND MIXER
Filed Nov. 10, 1951 2 Sheets-Sheet 1

INVENTOR.
Mary M. Alexander
BY
Robt. W. Pearson
ATTORNEY.

Sept. 8, 1953  M. M. ALEXANDER  2,651,343
AUTOMATIC SALAD CHOPPER AND MIXER
Filed Nov. 10, 1951  2 Sheets-Sheet 2
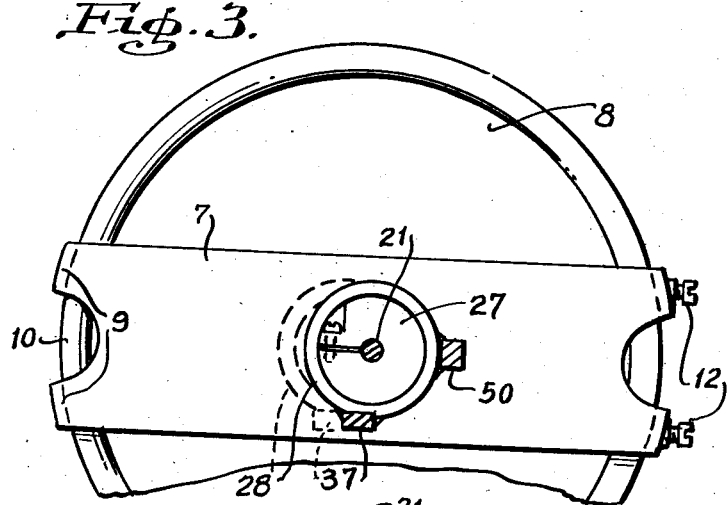
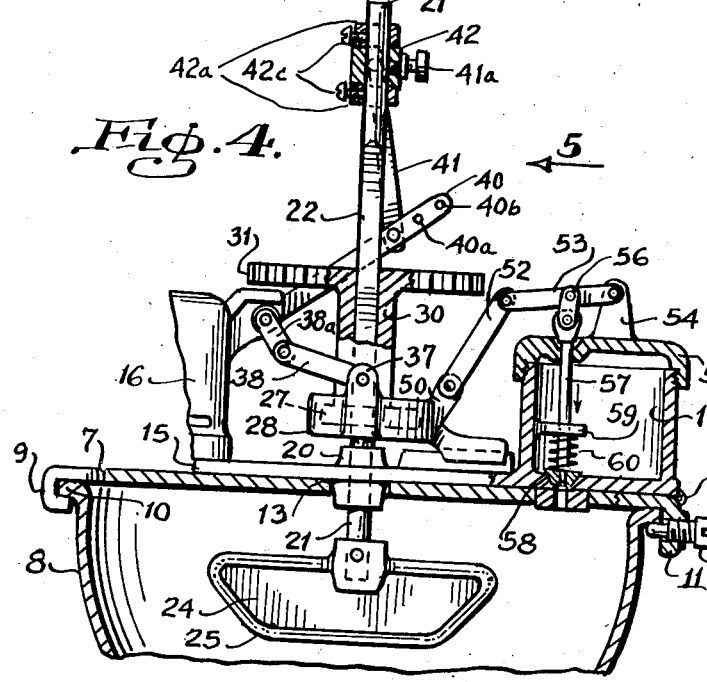
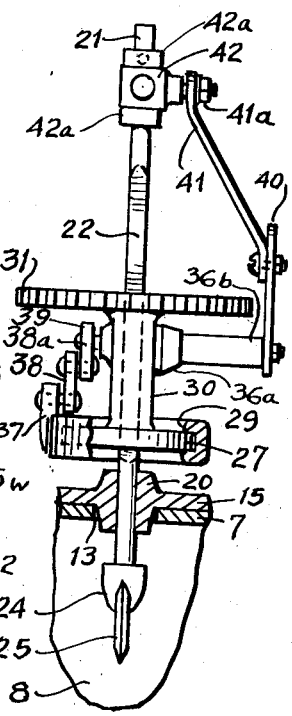
INVENTOR.
Mary M. Alexander
BY
Robt. D. Pearson
ATTORNEY.

Patented Sept. 8, 1953

2,651,343

UNITED STATES PATENT OFFICE 2,651,343

AUTOMATIC SALAD CHOPPER AND MIXER

Mary M. Alexander, Los Angeles, Calif.

Application November 10, 1951, Serial No. 255,761

12 Claims. (Cl. 146—64)

This invention relates to an automatic salad chopping and mixing machine.

More specifically, the present invention pertains to a motor driven device which, while in operation, continuously reciprocates a chopping member and simultaneously intermittently dispenses minor quantities of a salad dressing into the mass of edible material being chopped.

One object of the invention is greatly to lessen the time required and labor expended hitherto required in making salads, not only for home use, but more particularly for being served in restaurants, hotels and boarding houses.

Another object is to provide a means for chopping salads to a more uniform degree of fineness than results when the operation is performed by manually operating a chopping instrument.

A more specific object is to provide a compact and improved assembly of motor driven parts in a chopping device, which includes a cam and co-operating linkage, capable of chopping the edible vegetable and at the same time automatically mixing thereinto the desired quantity of seasoning or dressing, the latter being admitted through a valve intermittently opened for short intervals by the mechanism.

By this invention there is provided a new and advantageous assembly of co-operating gears and levers arranged in so compact a manner that the whole assembly, together with a motor to transmit therethrough, may be mounted upon the cover of a moderately sized container of the material to be chopped.

Other objects, advantages and features of invention will hereinafter appear.

Referring to the accompanying drawings, which illustrate a preferred embodiment of the invention, Fig. 1 is a plan view of the device with a side portion broken off to contract the view, the plane of section being indicated by line 1—1 on Fig. 2.

Fig. 3 is a fragmentary horizontal section on line 3—3 of Fig. 2.

Fig. 4 is a vertical midsection which differs from Fig. 2 only in that it is of a fragmentary character and shows in full lines the dispensing valve closed and the chopping head in its elevated position.

Fig. 5 is a fragmentary vertical section viewing the structure of Fig. 4 from right to left, as indicated by the arrow 5 on the latter view, parts being shown in elevation.

Figure 1:
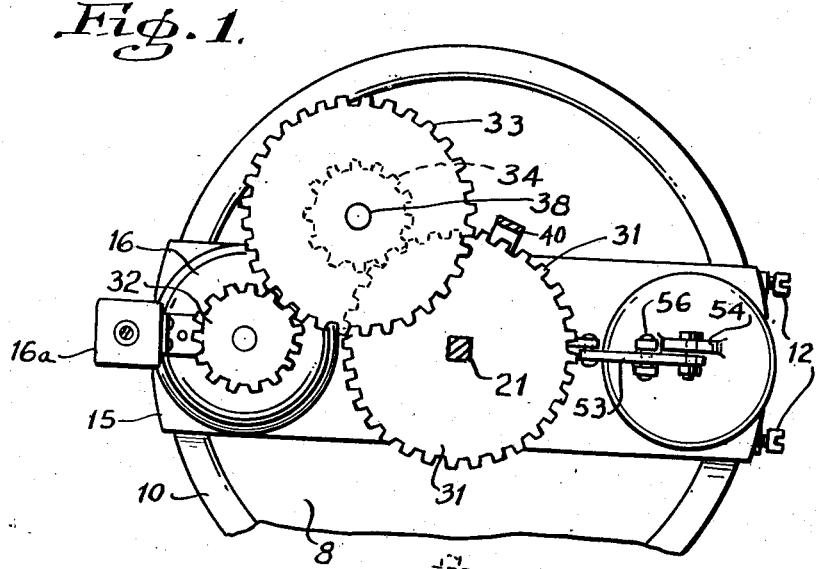

Referring in detail to the drawings, a horizontal base plate 7 is shown mounted in an overlying relation to an otherwise open topped chopping bowl 8, this plate forming part of a mechanism supporting structure presently to be described. Said base plate 7 is shown as being of an elongated, generally rectangular shape and having at one end downturned corner portions 9 which form ears the end portions of which are inwardly directed to underlie the rim 10 of said bowl, the corner portions 11 of the opposite end of said plate being deflected so as to extend vertically downward and each carrying a clamping screw 12. Said plate 7 is shown provided with a central, circular aperture 13.

Said base plate 7 forms the lower part of a supporting structure which includes a mounting plate 15 secured, for example, by welds 15w to said base plate 7. At one end said plate 15 carries a motor 16 provided with a timer 16a, and at its opposite end carries (shown as integral therewith), a container 17 provided to contain olive oil or condiment for salad chopped in the bowl 8, or which may contain any other desired modifying substance in liquid form.

The aforesaid opening 13 through the base plate 7 affords room for the lower part of a hublike bearing enlargement 20 formed in the mounting plate 15, this enlargement being interiorly shaped to slidably and rotatably contain a rod 21 that reciprocates therein, said rod being shown having a flattened side portion 22, where it is square in cross section.

At its lower end said rod 21 has a chopping head 24 secured thereto. This chopping may be of a conventional character, and is shown carrying a single cutting blade 25 of a sufficient length to insure sufficient chopping and mixing of the salad 26 or other material being chopped.

The already mentioned flattened side portion 22 of the rod 21 is shown extending along the greater part of the length of the rod, thus providing for slidably mounting the rod within an eccentric circular cam 27 so that the cam will turn with the rod, this cam having fitted around it an annular member 28 having inwardly directed rim portions 29 which, so far as vertical movements are concerned, maintain a fixed relation between the cam and an annular member, while permitting their relative rotation.

Said cam 27 is shown integral with an upwardly extending sleeve 30 which carries at its upper end a gear 31 shown as integral with the sleeve, it being understood that the gear and sleeve are also in a slidable, nonrotatable relation to the rod 21. Said gear 31 is driven at a reduced speed by the motor 16 through the motor gear 32 and intermediate gears 33 and 34, the latter two gears being shown fixed to a shaft 38 upstanding from the motor's extension 39.

Figure 2:
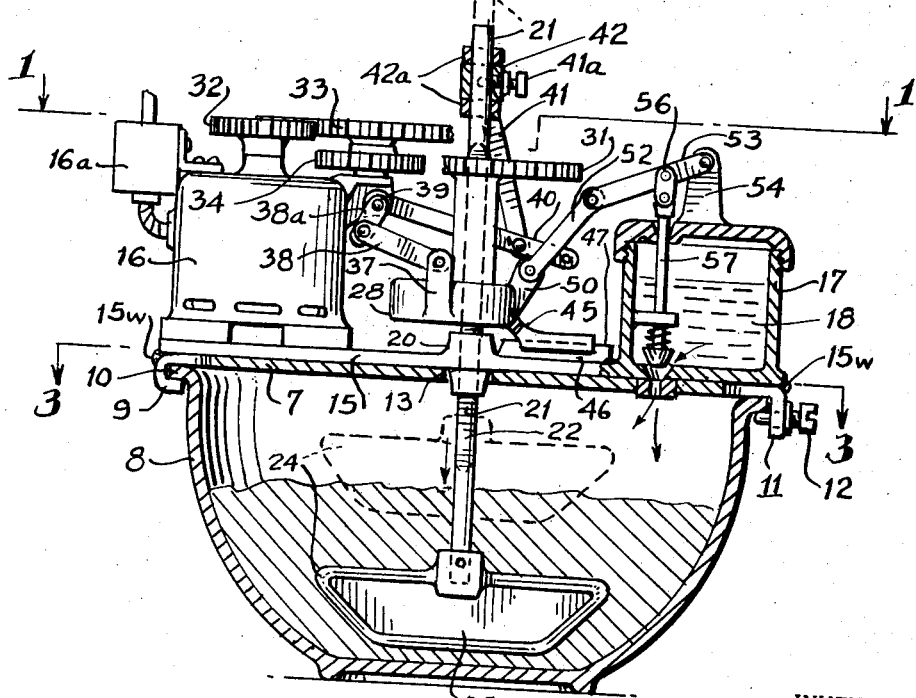
Fig. 2 is a vertical midsection of the device, the chopping head being shown in its lowest position in full lines and in its uppermost position in dotted lines.

The aforesaid annular member 28 carries a short, upstanding arm 37 which, by a link 38 is pivotally connected to the free end of a short crank arm 38a, in turn secured to one end of a stub shaft 39 rockably carried by a bearing enlargement 36a and sleeve 36b (see Fig. 5) which project from the aforesaid motor extension 39, the opposite end of said stub shaft having secured to it a relatively long swingable arm 40. Said arm 40 has pivot holes 40a and 40b whereby it has adjustably pivoted to it the lower end of a link 41, the upper part of said link being pivotally connected by a set screw 41a to a block 42 which is in a rotatable, non-slidable relation to the rod 21. Said block 42 is shown loosely fitted between upper and lower collars 42a and 42b secured to the rod by set screws 42c. Said annular member 28 is shown carrying integrally a horizontal downwardly offset arm 45 which extends radially from its right side as viewed in Figs. 2 and 4. This arm travels in its groove 46 on a horizontal guide strip 47 formed on the upper face of the mounting plate 15. By this means said annular member 28 is compelled to follow a straight path during its cam produced movements.

As a means for operating additional parts, the aforesaid ring 28 carries an outwardly inclined, upwardly directed boss or short arm 50 with which is pivotally connected the lower end portion of a link 52, the upper part of said link being pivotally connected to a cross arm 53. The opposite end of said cross arm is pivoted to the top of an arm or upstanding bracket 54 carried by the cover 55 of the already mentioned small container 17. A short link 56 connects the midlength portion of said cross arm 53 with the upper end of a stem 57 carrying at its lower end a valve 58 which opens and closes a passage which leads from the container 17 to the underlying part of the bowl 8. Said stem 57 operates through a guide arm 59, a compression spring 60 acting between said guide arm and the valve 58 normally to hold the latter in the closed position.

It will be seen that space is economized by mounting part of the gearing in a vertically superjacent relation to the motor 16.

In the operation of the machine, after the bowl 8 has been supplied with a suitable quantity of the material to be chopped, then the base plate 7, which carries the mounting plate 15 and the operating mechanism, is applied to the top of said bowl and is secured in place by screwing down the screws 12. Then, after the links 40 and 41 have been pivotally connected to each other as shown (using pivot hole 40a or 40b if a longer stroke is desired), the motor is started. When the motor starts, through the gearing which has been described (which includes the large driven gear 31, in a slidable non-turnable relation to the rod 21), the rod 21 will be continuously rotated, and with it will rotate the circular cam 27 which is eccentrically related to said rod. The rotation of said cam will cause a back and forth horizontal movement of the ring 28 which, by arm (or lug) 37, link 38 and crank arm 38a will rock the stub shaft 39. Rocking of said stub shaft will vertically swing the arm 40 which, through link 41 and block 42 will vertically reciprocate the rod 21 together with the chopping head 24. Hence it will be seen that said chopping head will be continuously rotated during its reciprocation, thus causing it to function efficiently as a chopper.

The aforesaid back and forth horizontal movement of the ring 28, through its arm or extension 50, the link 52 and cross arm 53 will intermittently operate the valve stem 57, thus feeding minor quantities of the salad oil 18 to the salad being chopped in the bowl 8.

I claim:

1. In a machine of the kind described, a supporting structure supportable on an otherwise open topped container when the latter is supported upon a horizontal surface, a vertical rod mounted upon said structure, a chopping head carried by said rod and positioned to chop material contained within said container, a circular cam eccentrically surrounding said rod in a slidable nonrotatable relation thereto, an annular member surrounding said cam in a rotatable relation thereto, motor driven means connected with said cam member to rotate the latter and thus impart a back and forth horizontal movement to said annular member, an operative connection between said annular member and rod which causes the latter to reciprocate vertically, valve controlled means positioned to dispense minor quantities of a modifying substance to the material being chopped in the aforesaid bowl, and an operative connection between said annular member and the valve of the latter means intermittently to open and close said valve while the machine is in operation.

2. In a machine of the kind described, a supporting structure supported on an otherwise open topped container when the latter is supported upon a horizontal surface, a vertical rod mounted upon said structure, a chopping head carried by said rod and positioned to chop material contained within said container, a circular cam eccentrically surrounding said rod in a slidable nonrotatable relation thereto, an annular member surrounding said cam in a rotatable relation thereto, a sleeve in a fixed relation to said cam and surrounding slidable relation to said rod, gearing operatively connected with said sleeve continuously to rotate the latter together with said cam and thus impart a back and forth horizontal movement to said annular member, a motor mounted upon said supporting structure and operatively connected to said gearing, and an operative connection between said annular member and rod which causes the latter to reciprocate vertically while rotating.

3. The subject matter of claim 2, and said motor driven gearing comprising a driven gear concentrically secured to said sleeve and a train of gearing operatively related to said driven gear.

4. In a machine of the kind described, a supporting structure supportable on an otherwise open topped container when the latter is supported upon a horizontal surface, a vertical rod mounted upon said structure, a chopping head carried by said rod and positioned to chop material contained within said container, a circular cam eccentrically surrounding said rod in a slidable nonrotatable relation thereto, a motor driven gear loosely surrounding said rod and operatively connected with said cam to rotate it together with said rod, a member mounted upon said rod in a rotatable non-slidable relation thereto, and means operatively connecting said cam with said member to cause said rod to reciprocate while being rotated.

5. In a machine of the kind described, mounting means having a container whereon said mounting means is removably supported, thus providing an open space thereunder, a vertical rod extending slidably and turnably through said mounting means, chopping means carried by said rod in said open space, a member carried by said rod in a rotatable non-slidable relation thereto, said member being at all times considerably spaced above said mounting means, a circular cam spaced considerably below said member, said cam eccentrically surrounding said rod in a slidable, nonrotatable relation thereto, a motor carried by said mounting means gearing operatively connecting said motor with said cam to rotate it together with said rod, and means operatively connecting said cam with said member vertically to reciprocate the latter to cause said rod to reciprocate while being rotated.

6. The subject matter of claim 5, and said means which operatively connects said cam with said member including a rockably mounted horizontal stub shaft having a crank arm fixed to one of its ends and a vertically swingable operating arm fixed to its opposite end, means operatively connecting said operating arm with said member, and means operatively connecting said crank arm with said cam.

7. In a machine of the kind described, the combination, with a support, a vertically extending vertically reciprocable rod rotatably mounted upon said support, and a chopping member carried by said rod; of a sleeve mounted upon said rod in a slidable, non-rotatable relation thereto, a gear concentrically secured to said sleeve, a motor driven train of gearing including a gear meshing with said gear secured to said sleeve, a circular cam in a surrounding, eccentrically secured relation to said sleeve, and means operatively connecting said cam with said rod to reciprocate the latter during its rotation.

8. In a machine of the kind described, the combination, with a horizontal mounting plate, a vertically extending vertically reciprocable rod rotatably mounted on said mounting plate and extending slidably downwardly therethrough, and a chopping member carried by said rod below said plate; of a sleeve above said plate mounted upon said rod is a slidable, non-rotatable relation thereto, a gear concentrically secured to said sleeve, motor driven means including gearing operatively connected with said gear for its continuous rotation, a circular cam eccentrically secured to said sleeve superjacent to said mounting plate, an annular member having a working fit around said cam so that the rotation of said rod causes said cam horizontally to reciprocate said annular member, and linkage operatively connecting said rod with said annular member so that the horizontal reciprocation of the latter causes said rod to reciprocate vertically.

9. In a machine of the kind described, a supporting structure supportable on an otherwise open topped container when the latter is supported upon a horizontal surface, a vertical rod mounted upon said structure, a chopping head carried by said rod and positioned to chop material contained within said container, a circular cam eccentrically surrounding said rod in a slidable nonrotatable relation thereto, a motor driven means operatively connected with said cam to rotate it together with said rod, a member mounted upon said rod in a rotatable non-slidable relation thereto, means operatively connecting said cam with said member to cause said rod to reciprocate while being rotated, and valve controlled means to dispense restricted quantities of a modifying liquid to the material being chopped, and means operatively connected with said cam intermittently to open and close the valve of said valve controlled means during operation of the machine.

10. In a machine of the kind described, the combination, with a support, a vertically extending vertically reciprocable rod rotatably mounted upon said support, and a chopping member carried by said rod; of a sleeve mounted upon said rod in a slidable, non-rotatable relation thereto, a gear concentrically secured to said sleeve, a motor driven train of gearing including a gear meshing with said gear secured to said sleeve, a circular cam in a surrounding, eccentrically secured relation to said sleeve, means operatively connecting said cam with said rod to reciprocate the latter during its rotation, and a container mounted upon said support and furnished with an outlet passage to deliver a modifying liquid substance to the material being chopped, a valve carried by said container to control the outflow of liquid therefrom through said passage, and means operatively connecting said cam with said valve to open and close the latter during each rotation of said rod.

11. In a machine of the kind described, the combination, with a horizontal mounting plate, a vertically extending reciprocable rod rotatably mounted on said mounting plate and extending slidably downwardly therethrough, and a chopping member carried by said rod below said plate; of a sleeve above said plate mounted upon said rod in a slidable, non-rotatable relation thereto, motor driven means operatively connected with said sleeve for its continuous rotation, a circular cam eccentrically secured to said sleeve superjacent to said mounting plate, an annular member having a working fit around said cam so that the rotation of said rod causes said cam horizontally to reciprocate said annular member, linkage operatively connecting said rod with said annular member so that the horizontal reciprocation of the latter causes said rod to reciprocate vertically, and a horizontally extending grooved guide member secured to the upper face of said mounting plate, and an arm rigidly secured to said annular member, said arm having a horizontal portion slidably fitted on the slide of said slide member to cause said annular member to travel in a straight horizontal path.

12. The combination, with a cover for a container; of an elongated mounting plate secured to and extending diametrically across the upper surface of said cover, a motor secured to and upstanding from one end portion of said mounting plate, a shaft upstanding from said motor and driven thereby, a driving gear axially secured to said shaft vertically above the space occupied by said motor, a vertical rod mounted upon and extending through the midlength portion of said mounting plate, a cam surrounding said rod in a slidable, nonrotatable relation thereto, a driven gear loosely surrounding said rod and operatively connected with said cam to rotate it together with said rod, a member mounted upon said rod in a rotatable non-slidable relation thereto, means operatively connecting said cam with said member to cause said rod to reciprocate while being rotated, and gearing carried by said mounting plate and operatively connecting said driving gear with said driven gear.

MARY M. ALEXANDER.

References Cited in the file of this patent

UNITED STATES PATENTS

| Number | Name | Date |
|---|---|---|
| 79,678 | Obrecht | July 7, 1868 |
| 712,276 | Edmonds | Oct. 28, 1902 |
| 2,266,186 | Fischer | Dec. 16, 1941 |
| 2,389,816 | Richardson | Nov. 27, 1945 |

FOREIGN PATENTS

| Number | Country | Date |
|---|---|---|
| 23,221 | Great Britain | Dec. 4, 1895 |